(12) United States Patent
Fassnacht

(10) Patent No.: US 7,934,573 B2
(45) Date of Patent: May 3, 2011

(54) METHOD FOR REGULATING THE STATE OF CHARGE OF AN ENERGY ACCUMULATOR IN A VEHICLE HAVING A HYBRID DRIVE UNIT

(75) Inventor: Jochen Fassnacht, Schramberg (DE)

(73) Assignee: Robert Bosch GmbH, Stuttgart (DE)

( * ) Notice: Subject to any disclaimer, the term of this patent is extended or adjusted under 35 U.S.C. 154(b) by 876 days.

(21) Appl. No.: 10/575,135

(22) PCT Filed: Aug. 5, 2004

(86) PCT No.: PCT/DE2004/001760
§ 371 (c)(1),
(2), (4) Date: May 14, 2007

(87) PCT Pub. No.: WO2005/044610
PCT Pub. Date: May 19, 2005

(65) Prior Publication Data
US 2007/0295543 A1    Dec. 27, 2007

(30) Foreign Application Priority Data

Oct. 6, 2003   (DE) .................................. 103 46 213

(51) Int. Cl.
*B60W 20/00*   (2006.01)
*B60W 10/24*   (2006.01)
(52) U.S. Cl. .................... 180/65.29; 180/65.21; 320/132
(58) Field of Classification Search ................. 180/274, 180/69.2, 69.21, 65.21, 65.29; 903/943, 903/960; 702/63; 701/36; 320/132, 134, 320/135, 136
See application file for complete search history.

(56) References Cited

U.S. PATENT DOCUMENTS

| | | | | |
|---|---|---|---|---|
| 4,313,080 A * | 1/1982 | Park | ............................... | 320/123 |
| 5,346,031 A * | 9/1994 | Gardner | ........................ | 180/179 |
| 5,469,816 A * | 11/1995 | Murakawa et al. | ............... | 123/2 |
| 5,550,445 A * | 8/1996 | Nii | ................... | 318/153 |
| 5,602,459 A * | 2/1997 | Rogers | ........................ | 320/138 |
| 5,786,640 A * | 7/1998 | Sakai et al. | ..................... | 290/17 |
| 5,808,448 A * | 9/1998 | Naito | .............................. | 322/13 |
| 5,846,155 A * | 12/1998 | Taniguchi et al. | ................ | 477/2 |
| 5,898,282 A * | 4/1999 | Drozdz et al. | ................ | 318/139 |
| 5,903,112 A * | 5/1999 | Yamada et al. | ................. | 318/10 |
| 5,929,595 A * | 7/1999 | Lyons et al. | .................. | 320/104 |
| 5,988,307 A * | 11/1999 | Yamada et al. | ............... | 180/243 |
| 6,091,228 A * | 7/2000 | Chady et al. | .................. | 320/132 |
| 6,116,368 A * | 9/2000 | Lyons et al. | .................. | 180/165 |
| 6,163,133 A * | 12/2000 | Laig-Horstebrock et al. | ............................ | 320/132 |
| 6,217,108 B1 * | 4/2001 | Sasaki | ....................... | 296/187.09 |

(Continued)

FOREIGN PATENT DOCUMENTS

| | | |
|---|---|---|
| DE | 44 30 670 | 3/1995 |
| DE | 100 53 430 | 6/2001 |

(Continued)

*Primary Examiner* — Jeffrey J Restifo
*Assistant Examiner* — Jacob Meyer
(74) *Attorney, Agent, or Firm* — Kenyon & Kenyon LLP

(57) ABSTRACT

A method for regulating the state of charge of an energy accumulator in a vehicle having a hybrid drive unit, a motor vehicle in particular, including an internal combustion engine and at least one electrical machine which can be coupled or are coupled to a power train of the vehicle. It is provided that a state of charge of the energy accumulator is regulated by a charge controller as a function of the vehicle's velocity.

22 Claims, 1 Drawing Sheet

U.S. PATENT DOCUMENTS

| | | | | |
|---|---|---|---|---|
| 6,293,362 B1* | 9/2001 | Sasaki et al. | | 180/274 |
| 6,332,115 B1* | 12/2001 | Nobusawa et al. | | 702/142 |
| 6,344,732 B2* | 2/2002 | Suzuki | | 320/132 |
| 6,364,402 B1* | 4/2002 | Sasaki | | 296/187.09 |
| 6,466,024 B1* | 10/2002 | Rogers | | 324/427 |
| 6,476,571 B1* | 11/2002 | Sasaki | | 318/139 |
| 6,499,555 B2* | 12/2002 | Ishizaki et al. | | 180/274 |
| 6,510,914 B2* | 1/2003 | Ishizaki et al. | | 180/274 |
| 6,516,278 B1* | 2/2003 | Ishizaki et al. | | 702/33 |
| 6,561,295 B1* | 5/2003 | Kuroda et al. | | 180/65.25 |
| 6,728,613 B2* | 4/2004 | Ishizaki et al. | | 701/36 |
| 6,896,086 B2* | 5/2005 | Ishizaki et al. | | 180/274 |
| 6,907,948 B2* | 6/2005 | Wakashiro et al. | | 180/65.25 |
| 6,949,897 B2* | 9/2005 | Wakashiro et al. | | 318/139 |
| 7,028,795 B2* | 4/2006 | Tabata | | 180/65.21 |
| 7,246,677 B2* | 7/2007 | Fredriksson et al. | | 180/274 |
| 7,260,461 B2* | 8/2007 | Rao et al. | | 701/45 |
| 7,303,040 B2* | 12/2007 | Green et al. | | 180/274 |
| 7,413,049 B2* | 8/2008 | Schramm et al. | | 180/274 |
| 7,541,917 B2* | 6/2009 | Hosokawa | | 340/436 |
| 7,543,677 B2* | 6/2009 | Igawa | | 180/274 |
| 7,575,273 B2* | 8/2009 | Wallman et al. | | 296/193.11 |
| 7,597,166 B2* | 10/2009 | Parks | | 180/69.2 |
| 7,614,472 B2* | 11/2009 | Kalliske et al. | | 180/274 |
| 2002/0043417 A1* | 4/2002 | Ishizaki et al. | | 180/274 |
| 2002/0134607 A1* | 9/2002 | Recknagel | | 180/274 |
| 2002/0157882 A1 | 10/2002 | Kubo et al. | | |
| 2002/0188387 A1* | 12/2002 | Woestman et al. | | 701/22 |
| 2003/0033060 A1* | 2/2003 | Okoshi | | 701/22 |
| 2003/0034187 A1* | 2/2003 | Hisada et al. | | 180/65.1 |
| 2003/0051936 A1* | 3/2003 | Ishizaki et al. | | 180/274 |
| 2003/0076109 A1* | 4/2003 | Verbrugge et al. | | 324/427 |
| 2004/0066286 A1* | 4/2004 | Stephan et al. | | 340/436 |
| 2004/0079564 A1* | 4/2004 | Tabata | | 180/65.2 |
| 2004/0108157 A1* | 6/2004 | Takafuji et al. | | 180/274 |
| 2004/0186643 A1* | 9/2004 | Tanaka et al. | | 701/45 |
| 2004/0232861 A1* | 11/2004 | Wakashiro et al. | | 318/139 |
| 2005/0014602 A1* | 1/2005 | Hara et al. | | 477/3 |
| 2006/0064220 A1* | 3/2006 | Murakami et al. | | 701/45 |
| 2006/0076171 A1* | 4/2006 | Donnelly et al. | | 180/65.2 |
| 2006/0253237 A1* | 11/2006 | Dannenberg et al. | | 701/36 |
| 2007/0159137 A1* | 7/2007 | Verbrugge et al. | | 320/132 |
| 2009/0212725 A1* | 8/2009 | Wallner | | 318/400.3 |

FOREIGN PATENT DOCUMENTS

| | | |
|---|---|---|
| EP | 1 136 311 | 9/2001 |
| JP | 8331772 | 12/1996 |
| JP | 11164402 | 6/1999 |
| JP | 2001268719 | 9/2001 |
| JP | 2002-354612 | 12/2002 |

* cited by examiner

METHOD FOR REGULATING THE STATE OF CHARGE OF AN ENERGY ACCUMULATOR IN A VEHICLE HAVING A HYBRID DRIVE UNIT

FIELD OF THE INVENTION

The present invention relates to a method for regulating the state of charge of an energy accumulator for storing electrical energy in a vehicle having a hybrid drive unit, a motor vehicle in particular.

BACKGROUND INFORMATION

Motor vehicles having a hybrid drive unit have, in addition to an internal combustion engine, at least one electrical machine which is able to be coupled to the power train of the motor vehicle. During generator operation, this electrical machine provides electrical energy which is stored in an energy accumulator, formed by the vehicle battery, until it is supplied to a consumer of the motor vehicle. During motor operation, the electrical machine alone or together with the internal combustion engine is used for the propulsion of the motor vehicle, in the latter case it being used to absorb the fluctuations in the output power of the power train, so that as far as possible the internal combustion engine is always kept in a consumption-optimized operating range in order to increase the efficiency of the drive and to reduce the environmental impact due to pollutants of the internal combustion engine. In order to ensure that sufficient energy is available to supply the electrical machine and the other consumers of the motor vehicle, the state of charge of the vehicle battery is continuously monitored and, as a rule, kept at a predefined constant value. In the event of a drop in the state of charge below this value, a charge controller of the battery requests electrical energy from the electrical machine which thereupon goes into generator operation in order to recharge the battery. However, this battery recharge is unnecessary when the motor vehicle is decelerated shortly thereafter and substantial amounts of kinetic energy of the motor vehicle are converted into electrical energy by the electrical machine and fed into the battery. While the vehicle is decelerating, the entire kinetic energy of the motor vehicle usually cannot be recovered; as a rule, however, a substantial portion can.

SUMMARY OF THE INVENTION

The method according to the present invention and the vehicle according to the present invention have the advantage over the related art that the kinetic energy of the vehicle may be taken into account in charging the energy accumulator in order to avoid the energy accumulator being charged by conversion of part of the driving power of the internal combustion engine if it is to be expected or it is likely that shortly thereafter a substantial amount of electrical energy is fed anyway into the energy accumulator due to deceleration of the vehicle.

The method according to the present invention for charge regulation is usable in particular in motor vehicles having a hybrid drive unit whose energy accumulator is operable with a variable state of charge, such as the newly developed NiMH (nickel metal hydride) battery. Using the method according to the present invention in these motor vehicles, the amount of energy stored in the energy accumulator may be kept variable; energy may be saved by predefining a suitable setpoint value, making it possible to lower the fuel consumption and reduce the environmental impact.

According to a preferred embodiment of the present invention, charging of the energy accumulator is delayed as the vehicle's velocity increases, preferably by lowering a setpoint value of the state of charge as the vehicle's velocity increases in such a way that, due to energy removal from the energy accumulator, the actual value of the state of charge drops below the setpoint value only at a later point in time.

Since it is normally not possible to recover the entire kinetic energy during deceleration of the vehicle, another preferred embodiment of the present invention provides that the setpoint value of the state of charge is lowered as a function of the instantaneous velocity by a value which corresponds to a likely charge to be received by the energy accumulator during deceleration of the vehicle from this instantaneous velocity to a standstill.

The setpoint value is appropriately predefined by a characteristic curve which is dependent on the velocity of the vehicle, a relatively simple regulation being possible when the setpoint value of the state of charge is lowered proportionally to the velocity of the motor vehicle. However, since the kinetic energy of the vehicle increases with the square of the velocity and thus, during deceleration by a certain velocity difference, the likely amount of electrical energy increases superproportionally with the velocity, the setpoint value of the state of charge may also be lowered in such a way that it superproportionally decreases with increasing velocity.

According to another advantageous embodiment of the present invention, the setpoint value is not lowered when energy for charging the energy accumulator is generated because of other reasons, for example, via energy recovery during a downhill drive. It is appropriate in this case to store the possibly generated surplus energy in the energy accumulator independently from the velocity in order to use it for its charge.

The velocity-dependent setpoint value of the state of charge may not only be used for the charge regulation of the energy accumulator, but may additionally also be included in an operating strategy for the internal combustion engine and the electrical machine.

DETAILED DESCRIPTION

Figure 1:
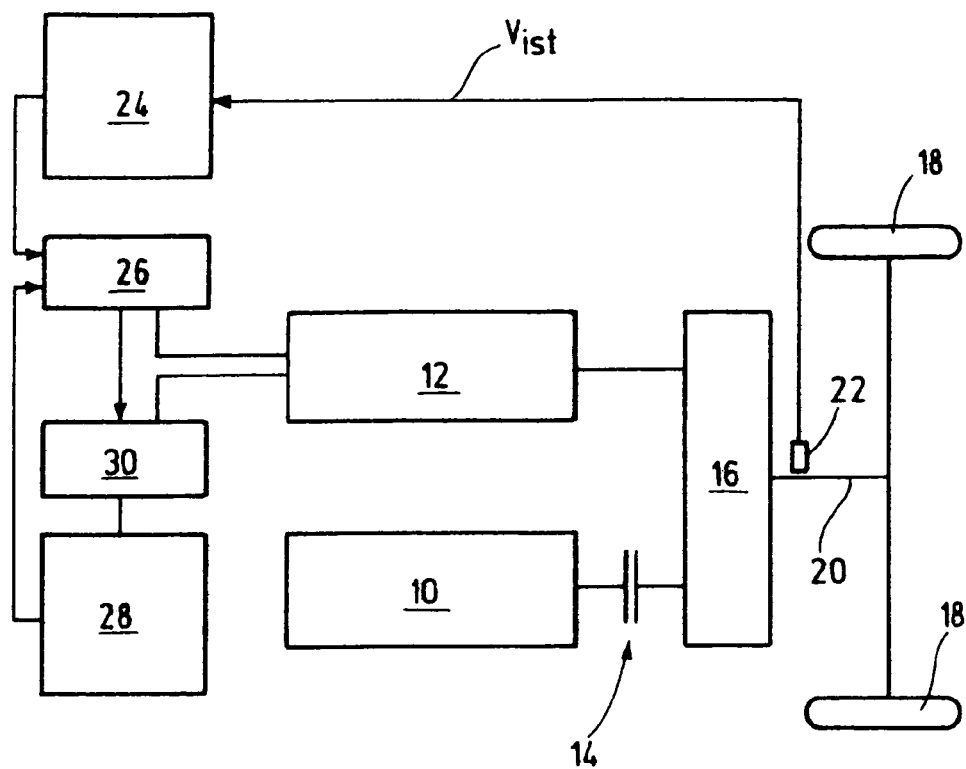
FIG. 1 shows a possible schematic diagram of components of a hybrid drive of a motor vehicle according to the present invention.

The hybrid drive unit of a motor vehicle schematically represented in FIG. 1 includes in a known manner an internal combustion engine 10 and an electrical machine 12. Internal combustion engine 10 is coupled to an output shaft 20 which drives drive wheels 18 of the motor vehicle via a clutch 14 and a transmission 16. Electrical machine 12 is also coupled to transmission 16 in order to keep internal combustion engine 10 always in a consumption-optimized operating state so that electrical machine 12 is able to supply part of the mechanical energy required for the propulsion of the motor vehicle. Furthermore, electrical machine 12 is used for generating electrical energy for supplying other consumers of the motor vehicle and may additionally be used as the starter for the internal combustion engine and/or as the sole drive for the motor vehicle at a relatively low velocity. Furthermore, the motor vehicle includes in a known manner a tachometer 22 which determines the instantaneous velocity of the motor vehicle from the instantaneous speed of drive wheels 18 or output shaft 20 and conveys it to an onboard computer 24.

Electrical machine 12, which is regulated by a control unit 26, is fed in its motor operation by a battery 28 of the motor vehicle, used as an energy accumulator, and recharges the battery in its generator operation when the instantaneous state of charge of battery 28 falls below a predefined setpoint value. Battery 28 is of a type which is able to be operated with a variable state of charge, such as an NiMH battery for example. An inverter 30 including a current regulator, which is situated between the battery and electrical machine 12 and the charge controller in control unit 26, which determines the instantaneous state of charge of battery 28 and sets it to the predefined setpoint value, are used for regulating the state of charge of battery 28.

If the motor vehicle is not being decelerated, electrical machine 12 is driven in this operating state by internal combustion engine 10 via transmission 16 and converts part of the mechanical power generated by the internal combustion engine into electrical energy which is then fed into battery 28. In order to keep the fuel consumption caused by this as low as possible, not only the instantaneous state of charge of the battery is taken into account in a conventional manner in the regulation of the charge of battery 28, but also the instantaneous velocity of the motor vehicle in such a way that a velocity-dependent setpoint value is used instead of a constant setpoint value of the state of charge, the velocity-dependent setpoint value being lowered with increasing velocity, at least within certain limits.

By using this type of regulation, the instantaneous kinetic energy of the motor vehicle may be taken into account; it is in part converted into electrical energy which in turn may be utilized for charging battery 28 when the motor vehicle is decelerated the next time. Since such a deceleration generally takes place within not too long a time span, a complete charge of battery 28 may be delayed up to this point in time due to the velocity-dependent lowering of the setpoint value of the state of charge. Since the complete charge of battery 28 takes place with the aid of the kinetic energy recovered during braking instead of using part of the driving power of internal combustion engine 10, energy and thus fuel may be saved and the environmental impact may be reduced.

The velocity-dependent setpoint value of the state of charge is predefined by charge controller 26 which contains a microcomputer, for example, which calculates the setpoint value by taking into account the instantaneous velocity $v_{actual}$, which is transmitted from onboard computer 24 and is generally available in digital form on a vehicle bus, and a setpoint characteristic curve which is dependent on the velocity and is stored in the microcomputer.

Figures 2, 3:
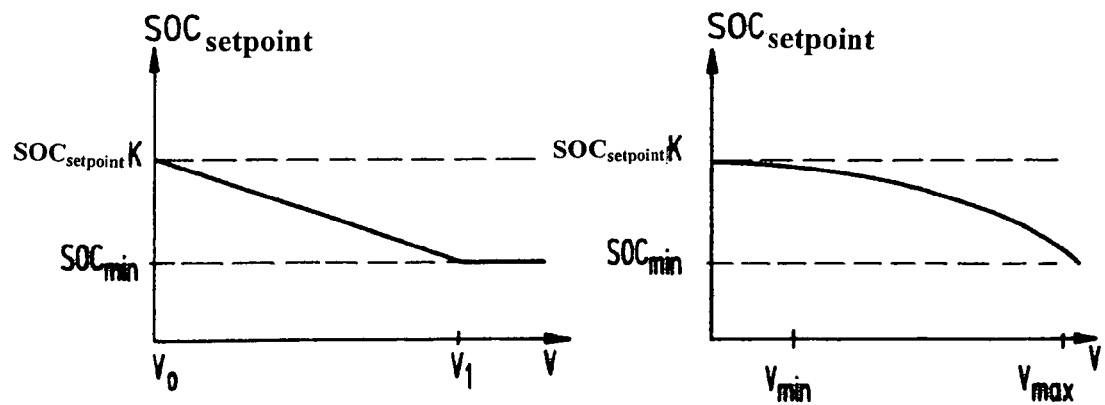
FIG. 2 shows a possible characteristic curve of the setpoint value of the state of charge of a battery of the motor vehicle as a function of the vehicle's velocity.
FIG. 3 shows another possible characteristic curve of the setpoint value of the state of charge of the motor vehicle battery.

Two such setpoint characteristic curves dependent on the velocity are represented in FIGS. 2 and 3 by way of example. While in the characteristic curve shown in FIG. 2, plotted over velocity v, the setpoint value of state of charge ($SOC_{setpoint}$) drops linearly in a predefined velocity range between standstill ($v_0$) and an upper limit ($v_1$) and is then kept constant in order to not fall below a lower limit of state of charge $SOC_{min}$ required by battery 28 and for the cold start, it remains constant in the characteristic curve shown in FIG. 3 up to a predefined minimum velocity $v_{min}$ and drops subsequently up to maximum velocity $v_{max}$ with increasing slope, remaining, however, above limit $SOC_{min}$.

In both characteristic curves, the difference between the respective velocity-dependent setpoint value $SOC_{setpoint}(v)$ and a constant conventional setpoint value $SOC_{setpoint}k$, indicated in the diagram by dashed lines, corresponds to that portion of the kinetic energy which may be recovered during deceleration from instantaneous velocity $v_{actual}$ to a standstill and which may be fed into battery 28 in the form of electrical energy. If battery 28 is not charged during deceleration of the motor vehicle for any reason, charging takes place as a rule directly subsequently using the driving power of internal combustion engine 10.

Using the described method, a rough prediction of the future energy flow may be established and unnecessary charging of battery 28 may be avoided in many cases. However, because of the latter reason, charging of battery 28 should not be dispensed with in the case of every energy oversupply, even when $SOC \geqq SOC_{setpoint}$.

The state of charge regulation according to the present invention is particularly usable in motor vehicles; it may, however, also be used in locomotives having hybrid drive units. The method according to the present invention is generally suitable for all hybrid vehicle concepts, such as those which have another electrical machine in addition to electrical machine 12. Moreover, the method according to the present invention may not only be used as a stand-alone but also in combination with other methods for state of charge regulation.

What is claimed is:

1. A method for regulating a state of charge of an energy accumulator for storing electrical energy in a vehicle having a hybrid drive unit, an internal combustion engine and at least one electrical machine which can be coupled to a power train of the vehicle, comprising:
    regulating the state of charge of the energy accumulator as a function of a velocity of the vehicle; and
    lowering a setpoint value of the state of charge by a value that corresponds to a likely charge to be received by the energy accumulator during a deceleration of the vehicle from an instantaneous velocity to a standstill;
    wherein the value that corresponds to a likely charge to be received is obtained by accessing a predefined characteristic curve that predicts the value that corresponds to a likely charge to be received as a function of velocity.

2. The method as recited in claim 1, further comprising:
    lowering a setpoint value of the state of charge with increasing velocity.

3. The method as recited in claim 1, further comprising:
    lowering the setpoint value of the state of charge by a value that is linearly proportional to the velocity.

4. The method as recited in claim 1, further comprising:
    lowering the setpoint value of the state of charge by a value which is exponentially proportional to the velocity.

5. The method as recited in claim 4, wherein the setpoint value forms an input variable of a strategy for operating the internal combustion engine and the at least one electrical machine.

6. A vehicle, comprising:
    a hybrid drive unit;
    a power train;
    an internal combustion engine;
    at least one electrical machine that can be coupled to the power train of the vehicle;
    an energy accumulator for storing electrical energy; and
    a charge controller for regulating a state of charge of the energy accumulator, wherein the charge controller:
    regulates the state of charge of the energy accumulator as a function of a velocity of the vehicle; and lowers a setpoint value of the state of charge by a value that corresponds to a likely charge to be received by the energy accumulator during a deceleration of the vehicle from an instantaneous velocity to a standstill;

wherein the value that corresponds to a likely charge to be received is obtained by accessing a predefined characteristic curve that predicts the value that corresponds to a likely charge to be received as a function of velocity.

7. The vehicle as recited in claim 6, wherein the energy accumulator includes one of a battery and a capacitor, and wherein the energy accumulator can be operated with a changeable state of charge.

8. The vehicle as recited in claim 6, wherein the energy accumulator includes an NiMH battery.

9. The vehicle as recited in claim 6, wherein a measured value of the velocity can be applied to the charge controller.

10. The method as recited in claim 1, wherein the energy accumulator comprises a NiMH battery.

11. The method as recited in claim 1, further comprising:
delaying the charging of the energy accumulator as the vehicle's velocity increases.

12. The method as recited in claim 1, wherein the setpoint value is not lowered when energy for charging the energy accumulator is generated via energy recovery during a downhill drive.

13. The method as recited in claim 12, further comprising:
storing surplus energy in the energy accumulator independently from the velocity.

14. The method as recited in claim 1, wherein the setpoint value drops linearly in a predefined velocity range between standstill and an upper limit and is then kept constant.

15. The method as recited in claim 1, wherein in a cold start the setpoint value remains constant up to a predefined minimum velocity and drops subsequently to a maximum velocity with increasing slope above a state of charge limit.

16. The vehicle as recited in claim 7, wherein the battery is a NiMH battery.

17. The vehicle as recited in claim 6, wherein the charge controller delays the charging of the energy accumulator as the vehicle's velocity increases.

18. The vehicle as recited in claim 6, wherein the charge controller does not lower the setpoint value when energy for charging the energy accumulator is generated via energy recovery during a downhill drive.

19. The vehicle as recited in claim 18, wherein the charge controller stores surplus energy in the energy accumulator independently from the velocity.

20. The vehicle as recited in claim 6, wherein the charge controller drops the setpoint value linearly in a predefined velocity range between standstill and an upper limit and then keeps the setpoint value constant.

21. The vehicle as recited in claim 6, wherein in a cold start, the setpoint value is kept constant up to a predefined minimum velocity and drops subsequently to a maximum velocity with increasing slope above a state of charge limit.

22. A method for regulating a state of charge of an energy accumulator for storing electrical energy in a vehicle having a hybrid drive unit, an internal combustion engine and at least one electrical machine which can be coupled to a power train of the vehicle, comprising:

calculating, for various values of instantaneous velocity, a likely amount of charge to be received by the energy accumulator during a deceleration of the vehicle from the instantaneous velocity to a standstill;

generating a first characteristic curve in which a setpoint value of the state of charge of the energy accumulator is lowered, as a function of the instantaneous velocity, by the calculated likely amount of charge, wherein the setpoint value decreases in proportion to the square of the instantaneous velocity in a predefined velocity range between the standstill and an upper limit, and is then kept constant;

generating a second characteristic curve in which the setpoint value is kept constant up to a predefined minimum velocity, then drops with a curved trajectory of increasing slope until a maximum velocity is reached, and is then kept constant;

providing a charge controller with access to the first and the second characteristic curves;

configuring the charge controller to regulate the state of charge of the energy accumulator in accordance with the second characteristic map when the vehicle is operating from a cold start, and in accordance with the first characteristic map at all other times; and further configuring the charge controller to provide an exception to control in accordance with the first characteristic map, the exception being that the setpoint value is not lowered when energy for charging the energy accumulator is generated via energy recovery during a downhill drive, in which case the charge controller stores surplus energy in the energy accumulator independently from the velocity.

* * * * *